United States Patent Office 2,710,880
Patented June 14, 1955

2,710,880

EXTRACTION OF LACTIC ACID

Edward M. Filachione, Chesney Downs, Philadelphia, Pa., Martin L. Fein, Riverside, N. J., and Edward H. Harris, Jr., Philadelphia, Pa., assignors to the United States of America as represented by the Secretary of Agriculture No Drawing. Application May 7, 1953,
Serial No. 353,691

12 Claims. (Cl. 260—535)

(Granted under Title 35, U. S. Code (1952), sec. 266)

A non-exclusive, irrevocable, royalty-free license in the invention herein described, for all governmental purposes, throughout the world, with power to grant sub-licenses for such purposes, is hereby granted to the Government of the United States of America.

This invention relates to the recovery of lactic acid from aqueous solutions by extraction with organic liquids, and in particular, to such recovery from aqueous solutions containing dissolved salts of inorganic acids.

An object of this invention is to provide a process for recovering lactic acid from aqueous solutions thereof, in particular, from fermentation liquors and other aqueous solutions containing coloring matter and other impurities. A further object is to provide a process for simultaneously extracting and purifying lactic acid in impure aqueous solutions. Another object is to provide a process whereby water-miscible alcohols and ketones, known to be excellent solvents for lactic acid, may be used to extract lactic acid from aqueous solutions thereof.

We have discovered that lactic acid may be advantageously recovered from aqueous solutions by extraction with organic solvents, and that such extraction processes may be made more efficient and economical by the presence of inorganic salts in the aqueous acid solution. We have further discovered that by a proper choice of salt and solvent the lactic acid can not only be recovered from the aqueous solution but a high degree of selectivity can be attained whereby the acid is dissolved by the solvent, but most of the impurities can be left in the raffinate, thus effecting a considerable purification of the lactic acid.

Lactic acid as generally made by the fermentation of various carbohydrate materials is a dark colored, ill-smelling aqueous solution containing, in addition to 10–15 percent lactic acid, unfermented carbohydrates, nutrients, salts, bacterial cells, etc. Recovery of pure acid from this liquor by conventional processes is tedious and expensive.

Many solvents have been proposed for the extraction of lactic acid from fermentation liquor, but none has been found that combines high efficiency with selectivity and low cost. Consequently, solvent extraction has not been widely used in the recovery and purification of lactic acid.

Because of its strongly polar, hydrophilic nature, lactic acid has solvent affinities so similar to those of water that most solvents which have a high affinity for the acid have a similar affinity for water and either are miscible with water or are highly soluble in it. To be useful for extracting lactic acid, the solvent must form a 2-phase system with the aqueous acid solution. In addition, it is highly desirable that the solvent be selective; that is, it should readily dissolve the lactic acid but not the various impurities accompanying the acid.

From the standpoint of solvent properties with respect to lactic acid and accompanying impurities, the solvents that appear most promising are the lower alcohols and ketones. However, the lower members of these classes are water-miscible, and the next higher ones are highly soluble in water; hence these are either inoperative or impractical as solvents for extracting lactic acid from aqueous solutions.

We have discovered that the highly efficient lower alcohols and ketones, despite their high solubility in water, can be used advantageously for extracting lactic acid from fermentation liquor or other aqueous solutions if a suitable water soluble salt is also present in a sufficient concentration. Not all salts are suitable and, of those that are usable, some are more effective than others. We prefer the soluble sulfates, particularly ammonium, sodium, and magnesium sulfates, though other salts, as for example, ammonium, magnesium, sodium, or calcium chloride, disodium phosphate, aluminum sulfate or any soluble ionized salt that will not react with lactic acid to form an insoluble lactate may be used.

It has long been known that the water-immiscible alcohols and ketones are good solvents for lactic acid and that this affinity for lactic acid increases as the number of carbon atoms in the solvent decreased. However, water solubility of the solvents increased likewise, and it was therefore impossible or impractical to use the alcohols and ketones having less than four carbon atoms, and even those having four carbon atoms suffered the severe handicap of high solvent losses in the extraction process because of their high solubility in water.

In accordance with our invention, alcohols and ketones of three to four carbon atoms, and especially the water-miscible alcohols and ketones of this range, are advantageously used as solvents for extracting lactic acid from aqueous solutions and in particular, from crude aqueous solutions, such as fermentation liquor, by virtue of the conjoint use of at least an equivalent amount of a soluble inorganic salt, the term "equivalent" being used in its chemical sense.

Our invention is illustrated by the following examples in which 10 or 20 percent aqueous solutions of lactic acid, with and without added inorganic salt, were shaken with an equal volume of organic solvent until equilibrium was established. The aqueous and organic layers were then separated and analyzed for lactic acid by titration. From these data the distribution coefficient, $$K = \frac{C_w}{C_s}$$

and percent extracted were calculated ($C_w$=concentration of lactic acid in the aqueous phase; $C_s$=concentration in solvent phase).

The results of several such experiments are shown in Table I.

TABLE I

| Example No. | Solvent | Salt Used Identity | Salt Used No. Equiv. | K | Acid Extracted, Percent |
|---|---|---|---|---|---|
| 1 | $CH_3CHOHCH_3$ | None | | Miscible | |
| 2 | $CH_3CHOHCH_3$ | $(NH_4)_2SO_4$ | 0.5 | do | |
| 3 | $CH_3CHOHCH_3$ | $(NH_4)_2SO_4$ | 2.0 | 0.67 | 81 |
| 4 | $CH_3CHOHCH_3$ | $MgSO_4$ | 1.5 | .32 | 93 |
| 5 | $CH_3CHOHCH_3$ | $Na_2HPO_4$ | 2.0 | 3.52 | 53 |
| 6 | $CH_3COC_2H_5$ | None | | Miscible | |
| 7 a | $CH_3COC_2H_5$ | $(NH_4)_2SO_4$ | 1.0 | 1.00 | 59 |
| 8 | $CH_3COC_2H_5$ | $(NH_4)_2SO_4$ | 0.5 | 1.41 | 43 |
| 9 | $CH_3COC_2H_5$ | $(NH_4)_2SO_4$ | 1.0 | 1.37 | 43 |
| 10 | $CH_3COC_2H_5$ | $(NH_4)_2SO_4$ | 2.0 | 1.24 | 34 |
| 11 | $CH_3COC_2H_5$ | NaCl | 0.5 | 1.48 | 32 |
| 12 | $CH_3COC_2H_5$ | NaCl | 1.0 | 1.51 | 34 |
| 13 | $CH_3COC_2H_5$ | NaCl | 2.0 | 1.53 | 36 |
| 14 | $CH_3COC_2H_5$ | $Na_2SO_4$ | 0.5 | 1.39 | 40 |
| 15 | $CH_3COC_2H_5$ | $Na_2SO_4$ | 1.0 | 1.29 | 44 |
| 16 | $CH_3COC_2H_5$ | $Na_2SO_4$ | 2.0 | 1.03 | 54 |
| 17 | $CH_3COC_2H_5$ | $CaCl_2$ | 0.5 | 1.47 | 31 |
| 18 | $CH_3COC_2H_5$ | $CaCl_2$ | 1.0 | 1.59 | 32 |
| 19 | $CH_3COC_2H_5$ | $CaCl_2$ | 2.0 | 1.77 | 23 |
| 20 | $CH_3COC_2H_5$ | $K_2Al_2(SO_4)_4$ | 0.5 | 1.41 | 24 |
| 21 | $CH_3COC_2H_5$ | $K_2Al_2(SO_4)_4$ | 1.0 | 1.39 | 25 |
| 22 | $CH_3COC_2H_5$ | $K_2Al_2(SO_4)_4$ | 2.0 | 1.41 | 25 |
| 23 | $CH_3COCH_3$ | None | | Miscible | |
| 24 | $CH_3COCH_3$ | $Na_2SO_4$ | 1.0 | do | |
| 25 | $CH_3COCH_3$ | $MgSO_4$ | 1.0 | do | |
| 26 | $CH_3COCH_3$ | $(NH_4)_2SO_4$ | 2.0 | 0.47 | 83 |
| 27 | $CH_3CHOHC_2H_5$ | $(NH_4)_2SO_4$ | 1.0 | 1.41 | 47 |
| 28 | $CH_3CHOHC_2H_5$ | $Na_2SO_4$ | 1.0 | 1.16 | 61 |
| 29 a | $CH_3CHOHC_2H_5$ | None | | Miscible | |
| 30 a | $CH_3CHOHC_2H_5$ | NaCl | 0.7 | 1.02 | 61 |
| 31 a | $CH_3CHOHC_2H_5$ | $(NH_4)_2SO_4$ | 0.4 | 1.09 | 64 |
| 32 a | $CH_3CHOHC_2H_5$ | $(NH_4)_2SO_4$ | 1.0 | 1.00 | 62 |
| 33 | $(CH_3)_3COH$ | None | | Miscible | |
| 34 | $(CH_3)_3COH$ | $Na_2SO_4$ | 1.0 | 0.71 | 81 |
| 35 | $(CH_3)_3COH$ | $(NH_4)_2SO_4$ | 1.0 | 0.82 | 82 |
| 36 | $(CH_3)_2CHCH_2OH$ | None | | 1.46 | 48 |
| 37 | $(CH_3)_2CHCH_2OH$ | $NH_4Cl$ | 1.0 | 1.50 | 43 |
| 38 | $(CH_3)_2CHCH_2OH$ | $(NH_4)_2SO_4$ | 1.0 | 1.53 | 44 |
| 39 | $(CH_3)_2CHCH_2OH$ | $Na_2SO_4$ | 1.0 | 1.39 | 48 |
| 40 | $(CH_3)_2CHCH_2OH$ | $CaCl_2$ | 1.0 | 1.55 | 44 |
| 41 | $C_2H_5C(CH_3)_2OH$ | $(NH_4)_2SO_4$ | 1.0 | 1.27 | 54 |
| 42 | $CH_3CHOHCH_2C(CH_3)_2OH$ | $(NH_4)_2SO_4$ | 1.0 | 0.87 | 82 |
| 43 | $CH_3COCH_2C(CH_3)_2OH$ | $(NH_4)_2SO_4$ | 1.0 | 0.66 | 80 |
| 44 | $CH_3COOCH_3$ | $Na_2SO_4$ | 1.0 | 1.44 | 43 |
| 45 a | $CH_2:CClCH_2OH$ | None | | Miscible | |
| 46 a | $CH_2:CClCH_2OH$ | NaCl | 0.5 | 1.05 | 70 |
| 47 a | $CH_2:CClCH_2OH$ | $Na_2SO_4$ | 0.4 | 1.08 | 70 |
| 48 a | $CH_2:CClCH_2OH$ | $(NH_4)_2SO_4$ | 0.3 | 1.19 | 65 |
| 49 a | $(CNC_2H_4)_2O$ | $(NH_4)_2SO_4$ | 1.0 | 2.18 | 30 |
| 50 | {$CH_3CHOHCH_3$, 60%; $CH_3COOCH(CH_3)_2$, 40%} | $(NH_4)_2SO_4$ | 1.0 | 0.95 | 63 | a In these examples 20% lactic acid solutions were used; in all others, 10% acid was used.

Example 51

To 200 ml. of 20 percent aqueous lactic acid was added 1.0 equivalent of ammonium sulfate. The solution was then extracted four times, batchwise with methyl ethyl ketone. The latter was supplied and used in the form of the ketone-water azeotropic composition (89% ketone) and in each extraction, an amount of azeotrope equal to the volume of the aqueous acid solution being extracted was used. The combined solvent layers amounted to 790 ml. and contained 95 percent of the lactic acid. The raffinate amounted to 168 ml. and contained 5 percent of the lactic acid. From the raffinate 9 ml. of ketone-water azeotrope was recovered by distillation.

The solvent layer was free of sulfate. Distillation, first of azeotrope, then of ketone, yielded a residue of purified lactic acid.

In the examples described, the extractions were conducted at room temperature as a matter of convenience. Somewhat more favorable distribution coefficients are obtained if the extractions are conducted at elevated temperatures up to the boiling point of the mixture. In practical application on a large scale this advantage may be sufficient to justify operation of the process at elevated temperatures. There is likewise some improvement in the distribution coefficient as the concentration of the aqueous lactic acid is increased. Also, smaller volumes are to be handled when more concentrated acid is used. Hence it is advantageous to concentrate the crude acid as much as practicable before the extraction step is performed.

If the desired end product is aqueous lactic acid, it may be advantageously obtained by conventional methods such as removal of solvent by distillation.

It is obvious that the most efficient technical application of this invention involves the use of the continuous counter-current extraction technique rather than the batch technique that we have used as a matter of convenience.

From the examples above and from the prior art, it is apparent that the most effective solvents for extraction of lactic acid are the lower alcohols and ketones, and that the effectiveness of these increases with decreasing molecular weight. However, those having less than five carbon atoms are either miscible with water (and with aqueous lactic acid) or are highly soluble therein; hence they are not of practical utility in the conventional extraction processes. However, in our process, where the lactic acid is accompanied by at least an equivalent amount of a soluble inorganic salt, these highly effective, but highly soluble, solvents may be used advantageously.

The salts vary widely in effectiveness, the sulfates being the preferred group. Ammonium sulfate is particularly effective. The chlorides are less effective and the phosphates are of little value.

Methyl and ethyl alcohols are not usable in our process. All of the propyl and butyl alcohols are operable and are highly efficient and, together with acetone and methyl ethyl ketone, constitute our preferred solvents.

We claim:

1. The process of recovering purified lactic acid from aqueous solution which comprises dissolving in said solution an amount of a soluble inorganic salt at least equivalent to the lactic acid in the solution, then extracting the lactic acid from the resulting solution by contacting the solution with an organic solvent selected from the group consisting of aliphatic alcohols and ketones having three to four carbon atoms, and recovering the lactic acid from the organic solvent.

2. The process of claim 1 wherein the salt is a sulfate.

3. The process of claim 1 wherein the salt is ammonium sulfate.

4. The process of claim 1 wherein the solvent is an alcohol of three to four carbon atoms.

5. The process of claim 1 wherein the solvent is isopropyl alcohol.

6. The process of claim 1 wherein the solvent is sec.-butanol.

7. The process of claim 1 wherein the solvent is tert.-butanol.

8. The process of claim 1 wherein the solvent is 2-chloroallyl alcohol.

9. The process of claim 1 wherein the solvent is a ketone of three to four carbon atoms.

10. The process of claim 1 wherein the solvent is methyl ethyl ketone.

11. The process of claim 1 wherein the solvent is miscible with water.

12. The process of claim 1 wherein the aqueous solution containing the lactic acid is the fermentation liquor in which the lactic acid is formed.

References Cited in the file of this patent

UNITED STATES PATENTS

| | | |
|---|---|---|
| 1,459,395 | Hamburger | June 19, 1923 |
| 2,092,494 | Bass | Sept. 7, 1937 |

FOREIGN PATENTS

| | | |
|---|---|---|
| 280,969 | Great Britain | June 14, 1928 |
| 538,060 | Great Britain | July 18, 1941 |